United States Patent
Tamashima

(10) Patent No.: US 7,139,020 B2
(45) Date of Patent: Nov. 21, 2006

(54) DIGITAL CAMERA INCLUDING THE COMPRESSION OF SIZE-REDUCED IMAGES AFTER PICTURE TAKING IS COMPLETED

(75) Inventor: Masao Tamashima, Sakai (JP)

(73) Assignee: Sanyo Electric Co., Ltd., Osaka (JP)

( * ) Notice: Subject to any disclaimer, the term of this patent is extended or adjusted under 35 U.S.C. 154(b) by 830 days.

(21) Appl. No.: 09/725,147

(22) Filed: Nov. 29, 2000

(65) Prior Publication Data

US 2001/0002845 A1    Jun. 7, 2001

(30) Foreign Application Priority Data

Dec. 1, 1999    (JP)    ................................. 11-341595

(51) Int. Cl.
*H04N 5/76*    (2006.01)
(52) U.S. Cl. ................................. 348/231.3
(58) Field of Classification Search ........... 348/231.99, 348/231.2, 231.6, 220.1, 333.05, 333.11, 348/231.3
See application file for complete search history.

(56) References Cited

U.S. PATENT DOCUMENTS

| | | | | |
|---|---|---|---|---|
| 5,153,730 A | * | 10/1992 | Nagasaki et al. | ........ 348/231.6 |
| 5,164,831 A | | 11/1992 | Kuchta et al. | |
| 5,724,579 A | * | 3/1998 | Suzuki | ..................... 707/104.1 |
| 6,137,534 A | * | 10/2000 | Anderson | ................ 348/222.1 |
| 6,415,102 B1 | * | 7/2002 | Fujii et al. | ................... 386/117 |
| 6,882,366 B1 | * | 4/2005 | Kijima et al. | ................ 348/294 |

FOREIGN PATENT DOCUMENTS

| | | |
|---|---|---|
| EP | 0 873 008 A2 | 10/1998 |
| JP | 05-167908 | 7/1993 |
| JP | 06-178261 | 6/1994 |
| WO | WO 99/14941 | 3/1999 |

OTHER PUBLICATIONS

Design Rule for Camera File System Jeita Standards, Dec. 1998.

* cited by examiner

*Primary Examiner*—Vivek Srivastava
*Assistant Examiner*—Timothy J. Henn
(74) *Attorney, Agent, or Firm*—Westerman, Hattori, Daniels & Adrian, LLP.

(57) ABSTRACT

A digital camera includes a CCD imager. In a successive picture-taking mode, each time a subject is taken by the CCD imager, a corresponding main image signal is compressed by a JPEG CODEC. The compressed main image signals produced upon each picture taking are accumulated in a SDRAM. A compression process of thumbnail image signals is performed after completing successive picture taking by the CCD imager. That is, each of the compressed main image signals secured in the SDRAM is decompressed by the JPEG CODEC, a thumbnail image signal is produced on the basis of a decompressed image signal so that a produced thumbnail image signal is compressed by the JPEG CODEC. When all the compressed thumbnail image signals are produced, each of a compressed main image signal and compressed thumbnail image signal is recorded onto a memory card.

5 Claims, 4 Drawing Sheets

DIGITAL CAMERA INCLUDING THE COMPRESSION OF SIZE-REDUCED IMAGES AFTER PICTURE TAKING IS COMPLETED

BACKGROUND OF THE INVENTION

1. Field of the Invention

This invention relates generally to digital cameras and, more particularly, to a digital camera which records, to a recording medium, in a compressed state of main and size-reduced image signals corresponding to respective images of a subject taken successively.

2. Description of the Prior Art

According to DCF (Design rule for Camera File system), there is a need of producing thumbnail image signals in addition to main image signals so that both the image signals are recorded in a compressed state to a recording medium. Consequently, in the conventional digital camera, the main image signal is first compressed and then the thumbnail image signal produced from the main image signal is compressed so that both compressed signals are recorded to a recording medium. Meanwhile, during successive picture taking, totally-twice compression processes of main and thumbnail image signals must be waited for taking the next picture. After completing the last-time picture taking, all the compressed signals are recorded to the recording medium.

However, during successive picture taking, the picture-taking interval increases if the next picture taking is commenced after twice of compression processes have been done. It would be possible to shorten the picture-taking interval by compressing both the main and thumbnail image signals after completing successive picture taking. This however results in increase in the capacity of an internal memory.

SUMMARY OF THE INVENTION

Therefore, it is a primary object of the present invention to provide a digital camera capable of reducing the picture-taking interval during successive shooting and suppresses the capacity of an internal memory.

According to the present invention, a digital camera for recording, in a compression state, a plurality of main image signals and a plurality of size-reduced image signals that correspond to a plurality of successively taken subject images to a recording medium, comprises: a main image compressor for compressing one of the main image signals each time picture taking is made once; and a size-reduced image compressor for compressing the plurality of size-reduced image signals after ending successive taking of pictures.

When a subject is successively taken of pictures, a plurality of main image signals and a plurality of size-reduced image signals are produced corresponding to a plurality of subject images successively taken. These image signals thus produced are recorded in a compressed state to a recording medium. Here, compression of the main signals is made by a main image compressor while compression of the size-reduced image signals is by a size-reduced image compressor. However, the main image compressor compresses one main image signal each time picture taking is made once, and the size-reduced image compressor compresses a plurality of size-reduced image signals after ending the successive picture taking.

Because a plurality of size-reduced image signals are compressed after ending successive picture taking in this manner, it is possible to shorten the picture-taking interval. Also, because the main image signal is compressed each time picture taking is made once, it is possible to suppress the capacity of an internal memory.

In one embodiment of the invention, a plurality of compressed main image signals produced by the main image compressor are temporarily held by a memory. When the successive picture taking is ended, a size-reduced image producer produces the plurality of size-reduced image signals on the basis of the plurality of compressed main image signals held by the memory after ending the successive taking of pictures. The size-reduced image compressor compresses the plurality of size-reduced image signals produced by the size-reduced image producer.

The size-reduced image producer includes a decompressor and a thinner. The decompressor decompresses the plurality of compressed main image signals held by the memory and the thinner performs thinning out on a plurality of decompressed main image signals produced by the decompressor and produce the plurality of size-reduced image signals.

In another embodiment of the invention, a size-reduced image producer produces one of the size-reduced image signals each time picture taking is made once. The size-reduced image signals produced by the size-reduced image producer are temporarily held the memory. The size-reduced image compressor compresses a plurality of size-reduced image signals held by the memory after ending the successive taking of pictures.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
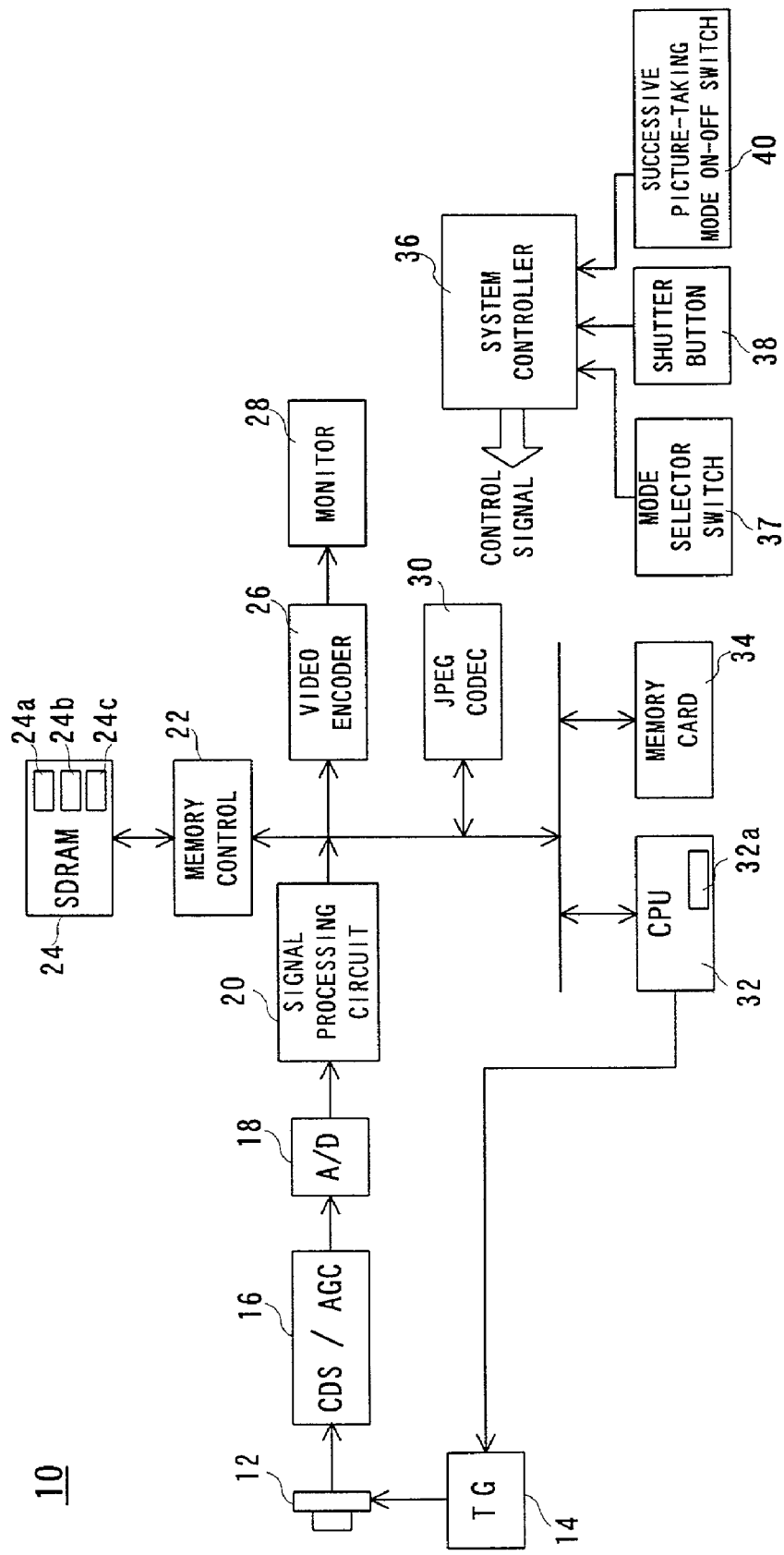
FIG. 1 is a block diagram showing a configuration of one embodiment of the present invention.

Referring to FIG. 1, a digital camera 10 of this embodiment includes a CCD imager (image sensor) 12. The CCD imager 12 has a light-receiving surface covered by a color filter (not shown) so that an optical image of a subject is illuminated through the color filter onto the light-receiving surface.

When an operator switches a mode-selector switch 37 to a "CAMERA" side, the system controller 36 establishes a camera mode. Thereupon, the CPU 32 instructs a timing generator (TG) 14 to perform thinning-out reading so that the CCD imager 12 is driven in the thinning-out reading scheme by the TG 14. Due to this, low-resolution camera signals (pixel signals) corresponding to the subject image are outputted from the CCD imager 12.

The output camera signal is subjected to well-known noise removal and level adjustment in a CDS/AGC circuit 16 and then converted into a digital signal by an A/D converter 18. A signal processing circuit 20 produces a YUV signal on the basis of the A/D-converted camera signal and supplies the produced YUV signal together with a write request to a memory control circuit 22. The YUV signal is written to an SDRAM 24 by a memory control circuit 22.

On the other hand, a video encoder 26 sends a read request to the memory control circuit 22. The memory control circuit 22 reads a YUV signal from the SDRAM 24 in response to that request. The video encoder 26 fetches the YUV signal thus read-out and converts the fetched YUV signal into a composite image signal. The converted composite image signal is outputted onto a monitor 28. As a result, real-time motion images (through-images) of the subject is displayed on the monitor 28.

When a shutter button 38 is pressed in a state that a successive-picture-taking mode on-off switch 40 is set to an "OFF" side, the system controller 36 outputs a corresponding control signal. At this time, a CPU 32 instructs the TG 14 to perform all-pixel reading. The TG 14 drives the CCD imager 12 in the all-pixel reading scheme on a one-screen-period basis. Due to this, a high-resolution camera signal in one screen is outputted from the CCD imager 12. That is, picture taking of a subject is made once, and a camera signal corresponding to a taken subject image is outputted from the CCD imager 12. The output camera signal is processed similarly to the above and a high-resolution YUV signal is secured within the SDRAM 24.

Note that a high-resolution YUV signal obtained by operating the shutter button 38 is hereinafter defined as a main image signal. Also, the main image signal is secured in a main image area 24*a* of the SDRAM 24.

The CPU 32 also instructs a JPEG CODEC 30 to compress the main image signal in timing of storing the main signal to the SDRAM 24. Responsive to a given compression command, the JPEG CODEC 30 first requests the memory control circuit 22 to read out a main image signal. The memory control circuit 22 reads a main image signal out of the main image area 24*a* in response to this read request and sends a read main image signal to the JPEG CODEC 30. The JPEG CODEC 30 performs JPEG compression on the main image signal to thereby produce a compressed main image signal. Producing the compressed main image, the JPEG CODEC 30 provides the compressed main image signal, together with a write request, to the memory control circuit 22. The compressed main image signal is stored to a compressed image area 24*c* of the SDRAM 24 by the memory control circuit 22.

After storing the compressed main image signal to the SDRAM 24, the CPU 32 instructs the memory control circuit 22 to perform thinning-out on the main image signal secured within the main image area 24*a*. The memory control circuit 22 performs vertical thinning-out and horizontal thinning-out processes on the main image signal in response to that instruction and creates a thumbnail image signal. The created thumbnail image signal is stored in a thumbnail image area 24*b*.

After creating a thumbnail image signal, the CPU 32 instructs the JPEG CODEC 30 to compress the thumbnail image signal. The JPEG CODEC 30 requests the memory control circuit 22 to read out a thumbnail image signal in response to the compression instruction and then performs JPEG compression on a read-out thumbnail image signal. After producing a compressed thumbnail image signal, the JPEG CODEC 30 provides this compressed thumbnail image signal, together with a write request, to the memory control circuit 22. The compressed thumbnail image signal is stored to the compressed image area 24*c* by the memory control circuit 22.

After securing the compressed main image signal and compressed thumbnail image signal within the SDRAM 24 in this manner, the CPU 32 sends a file preparing command and read request to the memory control circuit 22. The memory control circuit 22 first prepares an image file conforming to DCF in response to the file preparing instruction. In this image file is accommodated a compressed main image signal and compressed thumbnail image signal obtained by the above process. The memory control circuit 22 subsequently reads an image file out of the SDRAM 24 in response to a read request and provides a read-out image file to the CPU 32. The CPU 32 records the image file given from the memory control circuit 22 onto a memory card 34.

When the shutter button 40 is pressed in a state that a successive-picture-taking mode is set by the successive-picture-taking-mode on-off switch 42, successive picture taking is performed by the CCD imager 12. Main image signals and thumbnail image signals corresponding to respective subject images thus taken are recorded in a compressed state to the memory card 34. At this time, the CPU 32 processes a flowchart shown in FIG. 2.

Figure 2:
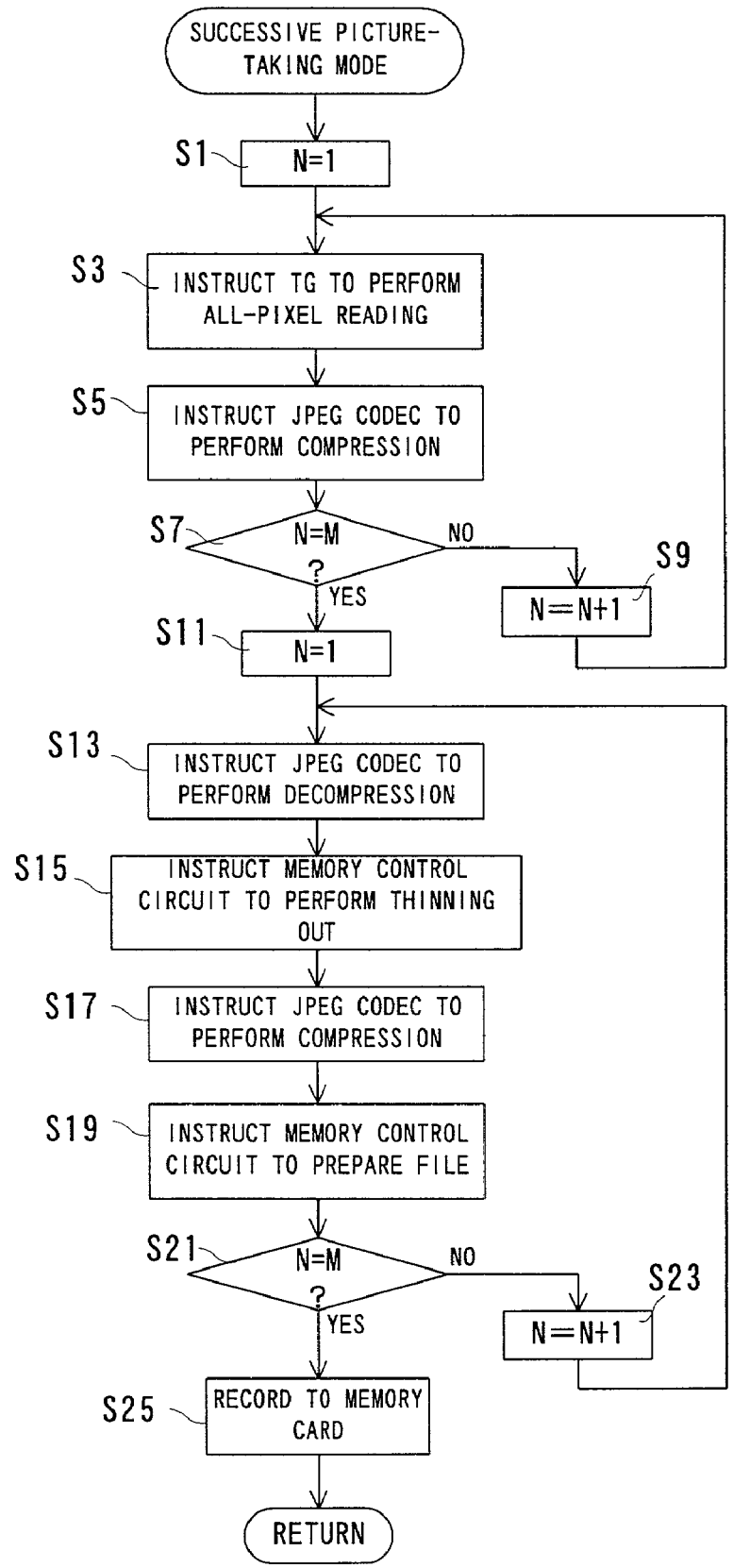
FIG. 2 is a flowchart showing part of operation of the FIG. 1 embodiment.

Referring to FIG. 2, when the shutter button 38 is pressed, the CPU 32 in step S1 first sets a count value of a counter 32*a* to "1" and then, in step S3, instructs the TG14 to perform all-pixel reading. The TG 14 drives the CCD imager 12 in the all-pixel reading scheme thereby outputting a high-resolution camera signal in one screen from the CCD imager 12. That is, the subject is taken once due to once of all-pixel read instruction, and a camera signal corresponding to a picture-taken subject image is outputted from the CCD imager 12. The output high-resolution camera signal is processed similarly to the above. As a result, a main image signal in one screen is secured in the main image area 24*a* of the SDRAM 24.

The CPU 32, in step S5, subsequently instructs the JPEG CODEC 30 to compress the main image signal. The JPEG CODEC 30 outputs a read request to the memory control circuit 22 in response to this instruction and performs JPEG compression on the main image signal read by the memory control circuit 22. The JPEG CODEC 30 also outputs the compressed main image signal produced by the JPEG compression, together with a write request, to the memory control circuit 22. The compressed main image signal is stored to the compressed image area 24*c* of the SDRAM 24 by the memory control circuit 22.

The CPU 32 advances to step S7 in timing that the compressed main image signal is secured in the compressed image area 24*c,* to compare a current count value N of the counter 32*a* with a predetermined value M (M: the number of pictures successively taken). Here, if the count value N has not reached the predetermined value M, the CPU 32 proceeds to step S9 and increments the counter 32*a* in this step, then returning to the step S3. This result in execution of M times a series of processes of taking a picture of a subject by the CCD imager 12, producing a main image signal corresponding to the taken subject image and compressing the produced main image signal. Thus, compressed main image signals in the number of M are secured within the compressed image area 24*c*.

When the count value N reaches the predetermined value M, the CPU 32 in step S7 determines "YES" and proceeds to processes of step S11 and the following. At first, in step S11, "1" is set to the counter 32*a*. Then, in step S13, the JPEG CODEC 30 is instructed to decompress a compressed image signal corresponding to the current count value N. The JPEG CODEC 30 requests the memory control circuit 22 to read out Nth-produced compressed main image signal and performs JPEG decompression on a compressed main image signal read out of the compressed image area 24c. The JPEG CODEC 30 furthermore requests the memory control circuit 22 to write the produced decompressed main image signal. The decompressed main image signal is written to the main image area 24a of the SDRAM 24 by the memory control circuit 22.

The CPU 32 advances to step S15 in timing that the decompressed main image signal is written to the SDRAM 24 and, in this step, instructs the memory control circuit 22 to perform thinning-out on the decompressed main image signal. The memory control circuit 22 performs thinning-out on the decompressed main image signal stored in the main image area 24a to create a thumbnail image signal and stores a created thumbnail image signal to the thumbnail image area 24b.

After creating the thumbnail image signal, the CPU 32 advances to step S17 to instruct the JPEG CODEC 30 to compress the created thumbnail image signal. The JPEG CODEC 30 requests the memory control circuit 22 to read a thumbnail image signal and performs JPEG compression on a read thumbnail image signal. Obtaining a compressed thumbnail image signal, the JPEG CODEC 30 outputs the compressed thumbnail image signal together with a write request to the memory control circuit 22. The compressed thumbnail image signal is stored in the compressed image area 24c by the memory control circuit 22. That is, both the Nth-produced compressed main image signal and the corresponding thumbnail image signal are secured within the compressed image area 24c.

The CPU 32 in the succeeding step S19 sends a file preparing instruction to the memory control circuit 22. The memory control circuit 22 prepares an image file conforming to DCF in the compressed image area 24c, in response to the instruction. In this image file, the Nth compressed image signal and the Nth thumbnail image signal will be accommodated.

In step S21, the current count value N is compared to a predetermined value M. If N<M, the counter 32a in step S23 is incremented and then the process returns to the step S13. Due to this, the process of steps S13 to S23 is repeated until the count value N reaches the predetermined value M. That is, each compressed main image signal stored in the compressed image area 24c is subjected to JPEG decompression. Based on the decompressed main image signal, a thumbnail image signal is produced. The thumbnail image signal is subjected to JPEG compression. Then, the compressed main image signal and compressed thumbnail image signal in mutual correspondence is accommodated in a common image file. Image files in the number of M are obtained in the compressed image area 24c.

When the count value N reaches the predetermined value M, the CPU 32 advances to step S25 to record the image files in the number of M stored in the compressed image area 24c to the memory card 34. That is, the memory control circuit 22 is requested to read out image files so that the image files read out by the memory control circuit 22 are recorded onto the memory card 34. After recording all the image files, the CPU 32 returns to the main routine (not shown).

According to this embodiment, each time the image sensor takes one picture of a subject, a compression process on the corresponding main image signal is made. On the other hand, the compression process of the thumbnail image signal is first performed after ending the successive taking of pictures. Specifically, after securing the compressed main image signals in the number of M within the memory, each of the compressed main image signals is decompressed so that a thumbnail image signal is produced on the basis of the decompressed image signal. Then, a compression process is performed on the thumbnail image signals in the number of M.

Because the compressed thumbnail image signals are produced after ending the successive taking of pictures in this manner, it is possible to shorten the picture-taking interval of the image sensor. Also, the compression of main image signals in timing of between picture taking enables to reduce the internal memory capacity.

Figure 3:
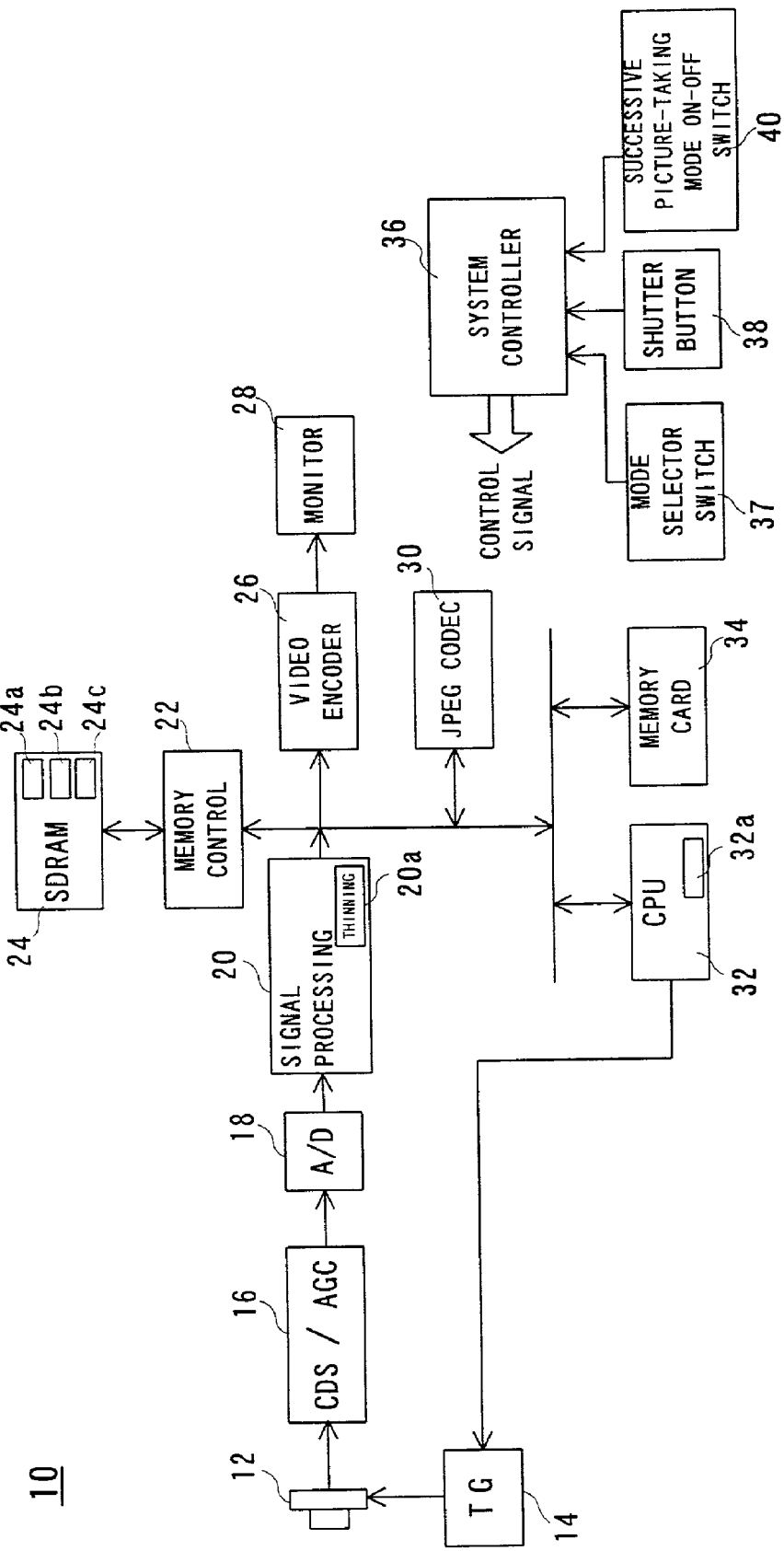
FIG. 3 is an illustrative view showing a configuration of another embodiment of the invention.

Referring to FIG. 3, a digital camera 10 of another embodiment has a thinning-out circuit 20a provided in the signal processing circuit 20 so that the thinning-out circuit 20a can produce thumbnail image signals from main image signals. Consequently, the operation after pressing the shutter button 30, in any of setting and not setting the successive picture-taking mode, is different from that of the FIG. 1 to FIG. 2 embodiment. However, the through-image display process before pressing the shutter button 38 is the same as that of the FIG. 1 to FIG. 2 embodiment. Hence, the through-image display process is omitted of explanation.

When the shutter button 38 is pressed in a state that the successive picture-taking mode is off, the CPU 32 instructs the TG 14 to perform all-pixel reading. The TG 14 drives the CCD imager 12 by the all-pixel-reading scheme thereby outputting one-screen camera signals corresponding to a subject image from the CCD imager 12. The output camera signal is inputted to the signal processing circuit 20 through the CDS/AGC circuit 16 and A/D converter 18.

In the signal processing circuit 20, a main image signal is produced on the basis of the input camera signal wherein, in the thinning-out circuit 20a, a thumbnail image signal is produced from the main image signal. That is, the thinning-out circuit 20a performs vertical and horizontal thinning-out processing on the main image signal thereby producing a thumbnail image signal. The signal processing circuit 20 outputs the produced main image signal and thumbnail image signal, together with a write request, to the memory control circuit 22. The main image signal and the thumbnail image signal are respectively written to the main image area 24a and the thumbnail image area 24b of the SDRAM 24 by the memory control circuit 22.

The CPU 32 first instructs, in timing of securing the main image signal and thumbnail image signal within the SDRAM 24, the JPEG CODEC 30 to compressed the main image signal. The JPEG CODEC 30 requests, in response to this instruction, the memory control circuit 22 to read out a main image signal and performs JPEG compression on a main image signal read out of the main image area 24a by the memory control circuit 22. Obtaining a compressed main image signal, the JPEG CODEC 30 instructs the memory control circuit 22 to write the compressed main image signal. The compressed main image signal is thus written to the compressed image area 24c of the SDRAM 24 by the memory control circuit 22.

The CPU 32 subsequently instructs the JPEG CODEC 30 to compress the thumbnail image signal. Consequently, the thumbnail image signal is also processed similarly to the above. That is, the thumbnail image signal secured in the thumbnail image area 24b is read out by the memory control circuit 22 and subjected to JPEG compression by the JPEG CODEC 30. Then, the produced compressed thumbnail image signal is stored to the compressed image area 24c by the memory control circuit 22.

After obtaining both the compressed main image signal and the compressed thumbnail image signal in this manner, the CPU 32 instructs the memory control circuit to prepare an image file. The memory control circuit 22 prepares an image file conforming to DCF, in response to the file-preparing instruction. In the image file, the compressed main image signal and the compressed thumbnail image signal will be accommodated. The CPU 32 further sends to the memory control circuit 22 a request to read out this image file and then fetches a read image file read by the memory control circuit 22. The fetched image file is recorded onto the memory card 34.

Figure 4:
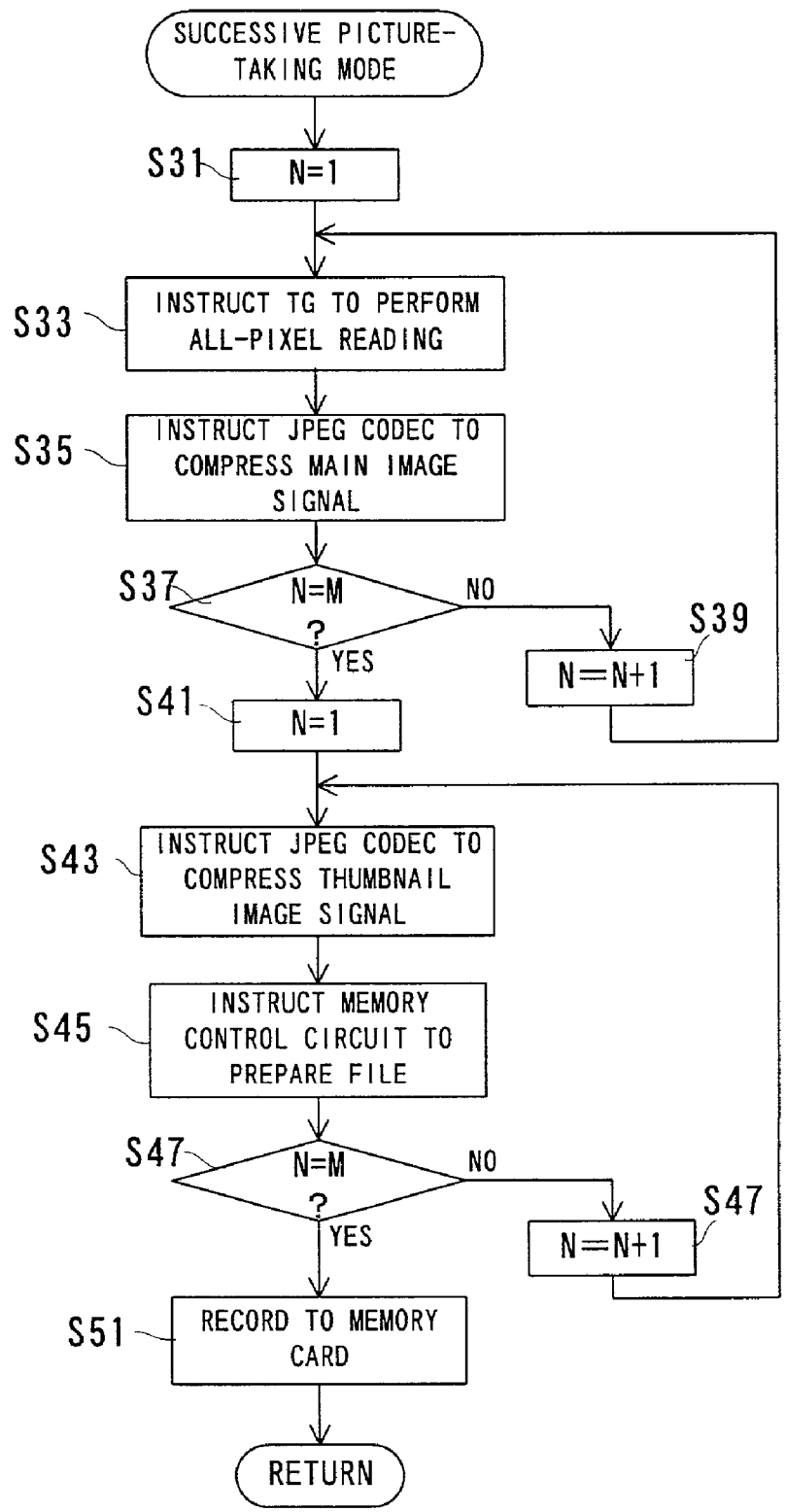
FIG. 4 is a flowchart showing part of operation of the FIG. 3 embodiment.

When the shutter button 38 is pressed in a state that the successive picture-taking mode is on, the CPU 32 processes a flowchart shown in FIG. 4. At first, in step S31 the count value N of the counter 32a is set to "1". Then, in step S33, the TG 14 is instructed to perform all-pixel reading. The TG 14 drives the CCD imager 12 by the all-pixel reading scheme and outputs one-screen camera signals from the CCD imager. That is, a subject is taken once due to one instruction of all-pixel reading so that a camera signal corresponding to the a subject image thus taken is outputted from the CCD imager 12. The output camera signal is processed similarly to the above, and the corresponding main image signal and the thumbnail image signal are stored respectively in the main image area 24a and the thumbnail image area 24b of the SDRAM 24.

The CPU 32 advances, in timing of securing the main image signal and thumbnail image signal to the SDRAM 24, to step S35 where it instructs the JPEG CODEC to compress the main image signal. The JPEG CODEC 30 instructs, in response to the compression instruction, the memory control circuit 22 to read out a main image signal and performs JPEG compression on a main image signal read out of the main image area 24a by the memory control circuit 22. Obtaining a compressed main image signal, the JPEG CODEC 30 requests the memory control circuit 22 to write this compressed main image signal. The compressed main image signal is thus written to the compressed image area 24c of the SDRAM 24 by the memory control circuit 22.

The CPU 32 advances, in timing of storing the compressed main image signal to the SDRAM 24, to step S37 where it compares the current count value N with a predetermined value M. If N<M, the counter 32a in step S39 is incremented and then the process returns to the step S33. Consequently, a series of processes of steps S33 to S39 are repeated until the count value N reaches M. At a time of reaching the count value N=predetermined value M, thumbnail image signals in the number of M are obtained within the thumbnail image area 24b and compressed main image signals in the number of M are within the compressed image area 24c.

If "YES" is determined in the step S37, the CPU 32 in step S41 sets the count value N again to "1" and subsequently, in step S43, instructs JPEG CODEC 30 to compress a thumbnail image signal corresponding to the current count value N. The JPEG CODEC 30 instructs the memory control circuit 22 to read out an Nth-produced thumbnail image signal and performs JPEG compression on a thumbnail image signal read out of the thumbnail image area 24b by the memory control circuit 22. The JPEG CODEC 30 further requests the memory control circuit 22 to write the produced compressed thumbnail image signal. Due to this, the compressed thumbnail image signal is written to the compressed image area 24c.

The CPU 32 thereafter, in step S45, sends a file preparing instruction to the memory control circuit 22. The memory control circuit 22 prepares, in response to this instruction, an image file conforming to DCF in the compressed image area 24 and accommodates an Nth compressed main image signal and compressed thumbnail image signal in this image file. In the following step S47, it is determined whether the current count value N is equal to the predetermined value M. If "NO", the counter 32a in step S47 is incremented and then the process returns to the step S43. The process of the steps S43 to S47 is repeated M times. As a result, image files in the number of M accommodating therein the mutually-corresponded compressed main image signals and compressed thumbnail image signals within the compressed image area 24c.

When the count value N reaches the predetermined value M, the CPU 32 advances to step S51 where it performs a record process for the image files in the number of M stored in the SDRAM 24. That is, the memory control circuit 22 is requested to read out an image file and records an image file read out by the memory control circuit 22 onto the memory card 34. Such a process is repeated M times, thereby recording all the image files in the number of M to the memory card 34. Completing the recording process, the CPU returns to the main routine (not shown).

According to this embodiment, each time the image sensor takes one picture, a main image signal and thumbnail image signal is produced and the main image signal is compressed. At a time of ending successive picture taking, compressed main image signals in the number M and thumbnail image signals in the number of M are secured within the memory. The compression process on the thumbnail image signals is performed after ending the successive picture taking, thereby providing compressed thumbnail image signals in the number of M.

In this manner, no compression process is done for the thumbnail image signals between the picture taking in the present time and the picture taking in the next time. That is, the compression process of thumbnail image signals, conventionally made between picture taking operations, is postponed up to the end of successive picture taking. This reduces the time interval of taking pictures. Also, compressing the main image signal between taking pictures reduces the internal memory capacity.

Incidentally, although the above embodiment takes picture of a subject by the CCD-type image sensor, it is needless to say that a CMOS-type image sensor may be used in place thereof. Also, although in the embodiment the image-file recording medium used a semiconductor memory, it is needless to say that a disk recording medium may be used in place thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera which records, in a coded state, a plurality of frames of main image data and a plurality of frames of size-reduced image data which are obtained by successive picture-taking operations to a recording medium, comprising:

a main image coder for coding a single frame of main image data every time a single picture-taking operation is carried out so as to create a single frame of coded main image data which is reduced in a data amount prior to the taking of the next successive picture;

a main image writer for writing the single frame of coded main image data to an internal memory every time a single coding operation is carried out by said main image coder; and a size-reduced image coder for coding the plurality of frames of size-reduced image data after ending the successive picture taking operations, wherein said main image coder adopts a JPEG format as a coding format.

2. A digital camera according to claim 1, further comprising:

a size-reduced image creator for respectively creating the plurality of frames of size-reduced image data based on a plurality of frames of the coded main image data held by said internal memory after ending the successive picture taking operations, wherein said size-reduced image coder codes the plurality of frames of size-reduced image data created by said size reduced image creator.

3. A digital camera according to claim 2, wherein said size-reduced image creator includes a decoder to decode the plurality of frames of coded main image data held by said internal memory so as to create a plurality of frames of decoded main image data, and a thinner to perform thinning out on the plurality of frames of decoded main image data so as to create the plurality of frames of size-reduced image data.

4. A digital camera according to claim 1, further comprising:

a size-reduced image creator for creating a single frame of size-reduced image data every time the single picture-taking operation is carried out; and a size-reduced image writer for writing the single frame of size-reduced image data to said internal memory every time a single creating operation is carried out by said size-reduced image creator, wherein said size-reduced image coder codes the plurality of frames of size-reduced image data held by said internal memory after ending the successive picture taking operations.

5. A digital camera which records, in a coded state, a plurality of frames of main image data and a plurality of frames of size-reduced image data which are obtained by successive picture-taking operations to a recording medium, comprising:

a main image coder for coding a single frame of main image data every time a single picture-taking operation is carried out so as to create a single frame of coded main image data which is reduced in a data amount prior to the taking of the next successive picture;

a main image writer for writing the single frame of coded main image data to an internal memory every time a single coding operation is carried out by said main image coder; and a size-reduced image coder for coding the plurality of frames of size-reduced image data after ending the successive picture taking operations, wherein both of the main image data to be coded by said main image coder and the size-reduced image data to be coded by said size-reduced image coder are digital image data.

* * * * *